(12) United States Patent
Khylenko

(10) Patent No.: US 10,581,809 B2
(45) Date of Patent: Mar. 3, 2020

(54) DEVICE FOR SENDING CONFIDENTIAL MESSAGES USING A MOBILE TELEPHONE (GADGET)

(71) Applicant: Volodymyr Vasiliovich Khylenko, Kyiv (UA)

(72) Inventor: Volodymyr Vasiliovich Khylenko, Kyiv (UA)

( * ) Notice: Subject to any disclaimer, the term of this patent is extended or adjusted under 35 U.S.C. 154(b) by 54 days.

(21) Appl. No.: 15/765,032

(22) PCT Filed: Oct. 5, 2015

(86) PCT No.: PCT/UA2015/000094
§ 371 (c)(1),
(2) Date: Mar. 30, 2018

(87) PCT Pub. No.: WO2017/061974
PCT Pub. Date: Apr. 13, 2017

(65) Prior Publication Data
US 2018/0288012 A1    Oct. 4, 2018

(51) Int. Cl.
*H04L 29/00*        (2006.01)
*H04L 29/06*        (2006.01)
(Continued)

(52) U.S. Cl.
CPC ........ *H04L 63/0428* (2013.01); *G06F 21/606* (2013.01); *G06F 21/74* (2013.01); *H04W 12/02* (2013.01)

(58) Field of Classification Search
CPC ... H04L 63/0428; G06F 21/606; G06F 21/74; H04W 12/02
See application file for complete search history.

(56) References Cited

U.S. PATENT DOCUMENTS 8,902,318 B1 * 12/2014 Haddad ................ H04N 5/2353
                                                                   348/207.99
9,147,068 B1 *  9/2015 Haddad ................... G06F 21/50
(Continued)

FOREIGN PATENT DOCUMENTS

| RU | 15157 U1 | 9/2000 |
| RU | 150869 U1 | 2/2015 |
| WO | 2007106152 A2 | 9/2007 |

OTHER PUBLICATIONS

Sifalakis et al. "Network address hopping: a mechanism to enhance data protection for packet communications", IEEE International Conference on Communications, Date of Conference: May 16-20, 2005.*

(Continued)

*Primary Examiner* — Morshed Mehedi
(74) *Attorney, Agent, or Firm* — DeLio Peterson & Curcio LLC; Thomas E. Ciesco

(57) ABSTRACT

The invention relates to the art of confidential communication. The technical result is that of providing a device user with the possibility of selecting one of two modes of communication, namely conventional communication or confidential communication for providing protection against unauthorized access. For this purpose there is proposed a device for sending confidential messages using a mobile telephone (gadget), said device comprising a housing in which are mounted a receiving and transmitting unit of the mobile telephone (gadget), a unit for generating/displaying source/target information, a unit for converting source/target information, a keyboard, a display and elements for controlling the mobile telephone (gadget), as well as a service information unit, a cryptographic computation unit and a reverse conversion unit, wherein the device is additionally provided with an on/off button module for activating/deactivating a confidential message receive/send mode, said (Continued)

button making it possible to switch the device into a confidential message receive/send mode or into a normal mobile telephone (gadget) operating mode, and with a button module for selecting the level of confidentiality.

4 Claims, 1 Drawing Sheet

(51) Int. Cl.
      *H04W 12/02*      (2009.01)
      *G06F 21/60*       (2013.01)
      *G06F 21/74*       (2013.01)

(56) References Cited

U.S. PATENT DOCUMENTS

| | | | | |
|---|---|---|---|---|
| 2002/0183005 A1* | 12/2002 | Yl | ............... | H04L 63/0428 455/41.1 |
| 2004/0048624 A1* | 3/2004 | Ko | ............... | H04W 48/16 455/457 |
| 2004/0098589 A1* | 5/2004 | Appenzeller | ......... | H04L 9/3073 713/170 |
| 2009/0049143 A1* | 2/2009 | Tarrago | ............... | H04L 12/185 709/206 |
| 2012/0173635 A1* | 7/2012 | Wormald | ............ | G06Q 10/107 709/206 |
| 2013/0117392 A1* | 5/2013 | Aceves | ............... | H04L 51/30 709/206 |
| 2014/0033316 A1* | 1/2014 | Paczkowski | ............ | G06F 21/74 726/26 |

OTHER PUBLICATIONS

Defrawy et al., "Leveraging Social Contacts for Message Confidentiality in Delay Tolerant Neworks", 2009 33rd Annual IEEE International Computer Software and Applications Conference, Date of Conference: Jul. 20-24, 2009.*

* cited by examiner

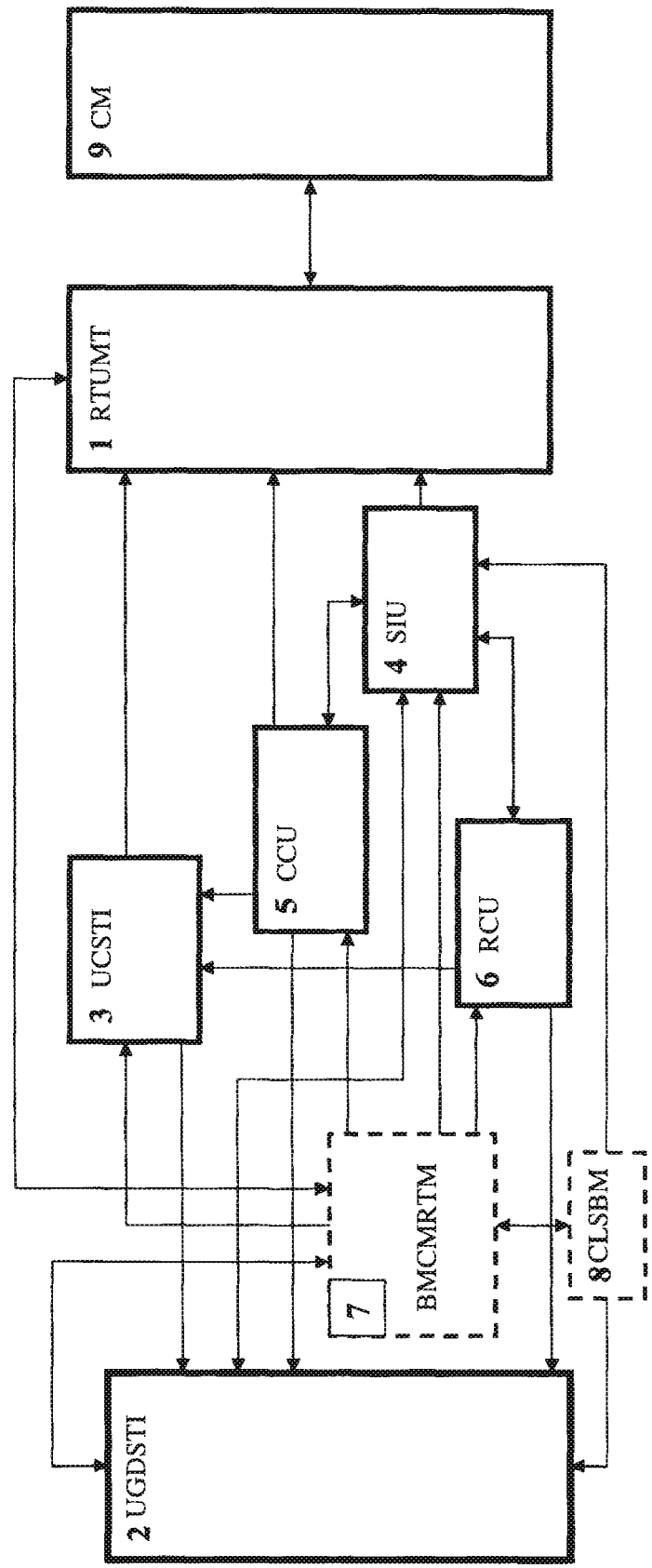

DEVICE FOR SENDING CONFIDENTIAL MESSAGES USING A MOBILE TELEPHONE (GADGET)

BACKGROUND OF THE INVENTION

Field of the Invention

The present invention relates to the confidential communication technology using radio channels and wire communication lines, including the Internet, and may be used for receiving on and transmitting confidential messages by a mobile phone with the possibility of providing them with increased protection against unauthorized access, and also may be used for receiving and transmitting messages in normal (regular) mode of mobile phone (gadget) operation.

Summary Of The Invention

In terms of the number of essential features the device closest to the proposed invention is the device for transmitting confidential messages over a mobile phone (gadget), said device comprising a housing hosting a receiving-transmitting unit of a mobile telephone (gadget), a unit for generating/displaying source/target information, a unit for converting source/target information, a keyboard, display and a mobile phone (gadget) controls, and also service information unit, cryptographic computation unit [Russian Federation Utility Model Patent No. 150869. IPC H04L 9/00 (2006.01), publ. on 27 Feb. 2015].

The described device has limited functionality, since it only allows reception/transmission of confidential messages recorded with a conductive pencil.

The proposed invention is based on the objective to provide such a device for transmitting confidential messages over a mobile phone (gadget) that would have more functionality in terms of creating conditions for receiving/transmitting messages, not only in the form of recorded texts, but also in the form of voice messages, as well as the capability to separate the device's functions into receiving/sending confidential messages and receiving/sending non-confidential messages, i.e., making it possible for the device to operate in normal mode of a mobile phone (gadget).

The object is achieved in the device according to the invention, which, like a known device for transmitting confidential messages over a mobile phone (gadget), comprises a housing hosting a receiving-transmitting unit of a mobile telephone (gadget), a unit for generating/displaying source/target information, a unit for converting source/target information, a keyboard, display and a mobile phone (gadget) controls, and also service information unit, cryptographic computation unit, wherein the device according to the present invention additionally comprises an on/off button module for confidential message receive/transmit mode, adapted to switch the device to confidential messages receiving-transmitting mode of operation or to normal operation mode of the mobile phone (gadget), and confidentiality level selection button module, said service information unit is intended for identification and generation of source (service) confidential information, i.e. a set of technological data defining the characteristics of confidential communication mode the cryptographic computation unit is designed to convert the source information into a certain class of matrices; with eigenvalues thereof uniquely corresponding to the source information, the reverse conversion unit intended for converting the resulting sequence of numbers in the form of a certain class of matrices, with eigenvalues thereof uniquely corresponding to the source information, into the target information, wherein the first output of the unit for generating/displaying source/target information of the mobile phone (gadget) is connected to the second input of the on/off button module for confidential message receive/transmit mode, while the first input of said module is connected to the first output of the receiving-transmitting unit, the second input of the unit for generating/displaying source/target information of the mobile phone (gadget) is connected to the first output of the unit for converting source/target information, while the second output of the latter unit is connected to the second input of the receiving-transmitting unit, the third input of the unit for generating/displaying source/target information is connected to the first input of the cryptographic computation unit in order to provide the source information in the form of a certain class matrices, with eigenvalues thereof uniquely corresponding to the source information, while the second output the latter unit is connected to the third input of the receiving-transmitting unit, which fourth output intended for connection to an input of a communication channel, the fourth input of the unit for generating/displaying source/target information is connected to the first output of the reverse conversion unit, while the second input of the latter unit is connected to the first output of the service information unit, the fifth input of the unit for generating/displaying source/target information is connected to the second output of the service information unit, while the fourth output of the latter unit is connected to the fifth input of the receiving-transmitting unit, the third output of the service information unit is connected to the third input of the cryptographic computation unit, while the fourth output of the latter unit is connected to the third input of the unit for converting source/target information, the third output of the reverse conversion unit is connected to the fourth input of the unit for converting source/target information, the sixth input of the unit for generating/displaying source/target information is connected to the first output of the confidentiality level selection button module, while the second input of the module is connected to the seventh input of the on/off button module for confidential message receive/transmit mode, the third input of the confidentiality level selection button module is connected to the sixth input of the service information unit.

A feature of the provided device is that the on/off button module for confidential message receive/transmit mode is configured to transmit/receive information signals through the cryptographic computation unit/reverse conversion unit with the possibility to adjust (select) the confidential mode level, while the third input of the module is connected to the fifth input of the source service information unit, the fourth output of the on/off button module for confidential message receive/transmit mode is connected to the fifth input of the cryptographic computation unit, and the fifth output of the module is connected to the fourth input of the reverse conversion unit.

In addition, the feature of the provided device that the on/off button module for confidential message receive/transmit mode is configured to transmit/receive information signals through the unit for converting source/target information of the mobile phone (gadget), while the sixth output of the on/off button module for confidential message receive/transmit mode is connected to the fifth input of the unit for converting source/target information, and the seventh input of the on/off button module for confidential message receive transmit mode is connected to the second input of the confidentiality level selection button module.

Another feature of the provided device is that the on/off button module for confidential message receive/transmit mode and the confidentiality level selection button module are provided in the form of a button or a switch located on the phone's (gadget's) body or in the form of touchscreen icons on the mobile phone's (gadget's) touchpad.

Due to the use of matrix algorithms as the cryptographic computation unit, i.e. the source information is transformed into a certain class of matrices, with eigenvalues thereof uniquely corresponding to the source information, and due to the fact that the reverse conversion unit is configured to transform the obtained sequence of numbers in the form of a certain class of matrices, with eigenvalues thereof uniquely corresponding to the source information, the provided device creates the conditions for receiving/transmitting messages not only in the form of the recorded texts, but also in the form of voice messages.

The device of the invention allows to choose between the normal communication mode and confidential mode with protection against unauthorized access. This function is provided by the on/off button module for confidential message receive/transmit mode, so that said module allows to switch from the traditional (normal) mode of a conventional mobile phone (gadget), like in a traditional telephone system (wire or wireless), to confidential mode, or to switch back from confidential mode and return to normal telephone communication.

The implementation Of the on/off button module for confidential message receive/transmit mode and confidentiality level selection button module in the provided device allows not only to enable/disable the confidential mode, but also to select the security level. Thus, the device (gadget) is provided with as new quality: it becomes a dual-mode (dual-function) device, rather than one-function device, in terms of protection from unauthorized access.

At the time of patent information research performed in the process of the present application preparation the author has not revealed any designs of devices for the transmission of confidential messages over a mobile phone (gadget) possessing the above mentioned set of essential features, which proves that the claimed technical solutions comply with "novelty" patentability criterion.

The technical result obtained as a result of the implementation of the provided invention is the possibility for a user to select one of two communication modes: usual communication by phone or confidential communication mode providing a certain level of protection against unauthorized access. This function is provided by adding on off button module for confidential message receive/transmit mode into device design, said module allowing a user to switch from the traditional (normal) communication mode of a usual mobile phone (gadget) to the confidential communication mode, as well as to return to a normal communication mode upon completion of confidential messages receiving/transmitting session. The required level of protection against unauthorized access may be selected due to the presence of the confidentiality level selection button module in the device.

The author has not revealed the indicated technical result in the known technical solutions of the prior art, therefore the provided device may be deemed to comply with the "inventive step" patentability criterion.

The provided device for the transmission of confidential messages over a mobile phone (gadget) consists of structural elements, which may be manufactured using presently known technological methods; means and materials. It can be used to solve problems of information exchange between users from different spheres of business, society and management structures, and therefore it can be concluded that the provided solution complies with "industrial applicability" patentability criterion.

BRIEF DESCRIPTION OF THE DRAWINGs

The essence of the provided invention is explained with reference to a block diagram of the device for transmitting confidential messages over a mobile phone (gadget) shown in FIG. 1.

DESCRIPTION OF THE PREFERRED EMBODIMENT(S)

A device for transmitting confidential messages over a mobile phone (gadget) is housed in a standard gadget body (not shown) and comprises a receiving-transmitting unit 1 of a mobile telephone (gadget) (RTUMT), a unit for generating/displaying source/target information 2 (UGDSTI), a unit for converting source/target information 3 (UCSTI). The housing also hosts: a service information unit 4 (SIU) configured to identify and generate source (service) confidential information, i.e. a set of technological data defining the characteristics of confidential communication mode, a cryptographic computation unit 5 (CCU), a reverse conversion unit 6 (RCU), and an on/off button module for confidential message receive/transmit mode 7 (BMCMRTM) configured to switch the device to the confidential messages receiving/transmitting mode or to the normal mode of operation of the mobile phone (gadget), a confidentiality level selection button module 8 (CLSBM).

The cryptographic computation unit 5 is configured to convert the source information into a specific class of matrices, with eigenvalues thereof uniquely corresponding to the source information. The reverse conversion unit 6 is configured to convert the resulting sequence of numbers in the form of a certain class of matrices, with eigenvalues thereof uniquely corresponding to the source information, into target information. The housing also hosts: keyboard, display, power supply and mobile phone (gadget) controls (not shown).

The first output of the unit for generating/displaying source/target information 2 of the mobile phone (gadget) is connected to the first input of the on/off button module for confidential message receive/transmit mode 7, while the first input of said module is connected to the first output of the receiving-transmitting unit 1, the second input of the unit for generating/displaying source target information 2 of the mobile phone (gadget) is connected to the first output of the unit for convening source/target information 3, while the second output of the latter unit is connected to the second input of the receiving-transmitting unit 1, the third input of the unit for generating/displaying source/target information 2 is connected to the first input of the cryptographic computation unit 5 in order to provide the source information in the form of a certain class of matrices, with eigenvalues thereof uniquely corresponding to the source information, while the second output of the latter unit is connected to the third input of the receiving-transmitting unit 1, which fourth output is intended for connection to a communication channel 9.

The fourth input of the unit for generating/displaying source/target information 2 is connected to the first output of the reverse conversion unit 6, while the second input of the latter unit is connected to the first output of the unit 4. The fifth input of the unit for generating/displaying source/target information 2 is connected to the second output of the unit 4, while the fourth output of the latter unit is connected to the fifth input of the receiving-transmitting unit 1. The third output of the unit 4 is connected to the third input of the cryptographic computation unit 5, while the fourth output of the latter unit is connected to the third input of the unit for converting source/target information 3. The third output of the reverse conversion unit 6 is connected to the fourth input of the unit for converting source/target information 3.

On/off button module for confidential message receive/transmit mode 7 may be set to enable the transmission/reception of information signals through the cryptographic computation units 5 and the reverse conversion unit 6. In this case, the third input of the module 7 is connected to the fifth input of the unit 4, the fourth output of the module 7 is connected to the fifth input of the cryptographic computation unit 5, and the fifth output of the module 7 is connected to the fourth input of the reverse conversion unit 6.

Also, the on/off button module for confidential message receive/transmit mode 7 may be configured to transmit/receive information signals through the unit for converting source/target information 3 of a mobile phone (gadget). In this case, the sixth output of the module 7 is connected to the fifth input of the unit for converting source/target information 3.

To enable selection of the confidential mode level, the seventh input of the on/off button module for confidential message receive/transmit mode 7 is connected to the second input of the confidentiality level selection button module 8, while the third input of the latter module is connected to the sixth input of the service information unit 4, and the first output of the confidentiality level selection button module 8 is connected to the sixth input of the unit for generating/displaying source/target information 2.

To establish communication, the participants of the communication session should be provided with the same devices for the transmission of confidential messages over a mobile phone (gadget) with modules 7 and 8 equipped with signaling devices: LEDs (not shown) or icons on the touch keypad, connected to the unit for generating/displaying source/target information 2 in order to establish the fact of another participant intention to conduct a communication session in confidential mode with the level of protection against unauthorized access selected and mutually agreed by participants of the communication session by means of the module 8.

The receiving-transmitting unit 1 may be a standard mobile phone unit (gadget).

The unit for generating/displaying source target information 2 may be a corresponding standard mobile phone unit (gadget).

A standard mobile phone unit (gadget) can be used as the unit 3.

The unit 4 may be implemented as a chip (a firmware module) receiving as an input the instruction to start/stop using confidential communication mode from the module 7 and also data defining the characteristics of the confidential communication mode, and outputting the technological parameters of the confidential communication mode corresponding to the embedded program and used in the operation of the cryptographic conversion unit 5 and the reverse conversion unit 6.

The unit 5 may be implemented as a chip (a firmware module) receiving as an input a digital sequence from the unit 2, passing through the module 7, and outputting a modified sequence corresponding to the embedded program.

The unit 6 may be a chip (a firmware module) similar to the unit 5, which implements the inverse function of forming a correspondence matrix, with eigenvalues thereof corresponding to the source information.

The module 7 may be implemented in the form of a button or a switch installed on the phone's (gadget's) body or in the form of touchscreen icon on the mobile phone's (gadget's) touchpad (not shown), which are connected to the chip (the firmware module) that generates instructions to use/stop using the confidential communication mode and data defining the characteristics of the confidential communication mode, and outputs technological parameters of the confidential communication mode corresponding to the embedded program and used by the unit 4, the cryptographic conversion unit 5, and the reverse conversion unit 6.

The module 8 may be implemented in the form of a button or a switch installed on the phone's (gadget's) body or in the form of touchscreen icon on the mobile phone's (gadget's) touchpad (not shown), which are connected to the chip (the firmware module) that implements the function of selection, information exchange and agreeing the confidentiality level by the participants in the communication session, confirms the selected confidentiality level and transfers it to the service information unit 4.

The communication channel 9 may be a traditional communication channel for mobile phones (gadgets).

The provided device for confidential messaging over a mobile phone (gadget) works as follows.

Initially, one of the two participants of the communication session, having the same devices for confidential messaging over a mobile phone (gadget), dials the telephone number of the second participant of the communication session on the keypad and acts on the module 7. Another participant of the communication session receives information on the signaling device of the module 7 of his/her mobile phone (gadget) about the intention of the first participant to conduct a communication session in confidential mode with the chosen security level and, in case of his/her consent, acts on the module 7 of his/her mobile phone (gadget). At this stage the second participant of the communication session may offer another security level of the communication session or to reject the communication session in a confidential mode. The final decision must be agreed upon by both participants. The choice of the confidential mode level may be realized in various ways, depending on the technological and structural characteristics of the mobile phone (gadget). For example, it may be implemented in one of the following ways:

1) As a function of the duration of pressing and holding the on/off button module for confidential message receive/transmit mode 7. Depending on the duration of pressing and holding the ran/off button module for confidential message receive/transmit mode 7, the displaying means of the unit 2 may incrementally visualize (provide sound signal corresponding to) the information on possible level of the confidential mode. When the desired level of the confidential mode appears on the indicator (touch panel) or is signaled in the voice mode, the participant of the communication session releases the on/off button module for confidential message receive/transmit mode 7. Another pressing of the on/off button module for confidential message receive/transmit mode 7 (with or without an additional confirmation request) confirms the users choice and starts the operation of the device, a mobile phone (gadget) in confidential mode.

Upon receipt of the consent for interaction in the confidential mode with the selected level of confidentiality from the second participant of the communication session, the exchange of information messages between the participants will occur using the cryptographic computation unit 5 and the reverse conversion unit 6. If the second participant rejects the communication session in the confidential mode, the mobile phone (gadget) of the first participant returns to a normal operation mode. If the second participant of the communication session proposes another confidentiality level for the communication session, the first participant makes a decision in the mode of an incoming call.

2) As a function of the number of pressing the corresponding button or tapping the icon in the confidentiality level selection button module 8. A communication session participant selects the confidential mode level using the confidentiality level selection button module 8 connected by the first input to the on/off button module for confidential message receive/transmit mode 7 and the service information unit 4, said selection is made by pressing the button or tapping the icon thereof. This button may be implemented as a physical button or switch installed on the phone's (gadget's) body or a combination of a number of keyboard keys, such that the needed function is realized by sequential or simultaneous pressing (acting upon) them, In modules 7 and 8, the source information is generated in the form of a digital sequence of binary signals, which is transmitted to the unit 4 to generate technological data defining the characteristics of the confidential communication mode, being transmitted to the cryptographic conversion unit 5, for the purpose of further additional conversion of the source information :arriving from the unit 2 through the module 8 and its representation in the form of a modified sequence of information signals, where modification is performed by putting matrices of a certain class into correspondence with the source digital signals, so that eigenvalues of said matrices uniquely correspond to the source information.

In a normal mode of operation of a mobile phone (gadget), the digital sequence at the output of the unit 5 formed as a result of the conversions is processed in the unit 3 and sent through the receiving-transmitting unit 1 to the communication channel 9 for transmission to the second participant of the communication session.

The response signal from the second participant of the communication session from the communication channel 9 through the receiving-transmitting unit 1 goes to the module 7 and, depending on the solution agreed and confirmed by the communication session participants, is processed in the device according to the instruction from the unit 7 either in a normal mode of operation of the mobile phone (gadget), or in the confidential communication mode. In the first case, according to the instruction received from the unit 7, the standard (normal) mode of operation of the mobile phone (gadget) is implemented, without the use of units 4 to 6. In the second case, upon the standard processing of the incoming digital signals by the mobile phone (gadget) (if necessary), the unit 3 performs reverse conversion operation for the received digital signals, where the source information is restored from the received sequence of numbers in the form of a certain class of matrices, with eigenvalues thereof uniquely corresponding to the source information, said source information (if necessary and with the repeated use of unit 3) being visualized or signaled the form of sound or graphic information in unit 2.

Item Numbers on the Device Block Diagram
1 Receiving-transmitting unit
2 Unit for generating/displaying source/target information
3 Unit for converting source/target information
4 Service information unit
5 Cryptographic computation unit
6 Reverse conversion unit
7 On/off button module for confidential message receive/transmit mode
8 Confidentiality level selection button module
9 Communication channel While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications arid variation as failing within the true scope and spirit of the present invention.

The invention claimed is:

1. A device for sending confidential messages over a mobile phone (gadget), comprising a housing hosting a receiving-transmitting unit of a mobile telephone (gadget), a source/target information generator/display, a source/target information converter, a keyboard, a display and mobile phone (gadget) controls, and also a device for generating and processing service information, cryptographic computer and received information converter, wherein the device additionally comprises an on/off button module for confidential message receive/transmit mode, adapted to switch the device to confidential messages receiving-transmitting mode of operation or to normal operation mode of the mobile phone (gadget), and confidentiality level selection button module, said device for generating and processing service information is intended for identification and generation of source (service) confidential information, being a technological data defining the characteristics of confidential communication mode, the cryptographic computer is designed to convert the source information into a class of matrices, with eigenvalues thereof uniquely corresponding to the source information, the received information converter is intended for converting a resulting sequence of numbers in the form of the class of matrices, with eigenvalues thereof uniquely corresponding to the source information, into the target information, wherein the first output of the source/target information generator/display of the mobile phone (gadget) is connected to the second input of the on/off button module for confidential message receive/transmit mode, while the first input of said module is connected to the first output of the receiving-transmitting unit, the second input of the source/target information generator/display of the mobile phone (gadget) is connected to the first output of the source/target information converter, while the second output of the source/target information converter is connected to the second input of the receiving-transmitting unit, the third input of the source/target information generator/display is connected to the first input of the cryptographic computer in order to provide the source information in the form of the class of matrices, with eigenvalues thereof uniquely corresponding to the source information, while the second output of the cryptographic computer is connected to the third input of the receiving-transmitting unit, which fourth output is intended for connection to an input of a communication channel, the fourth input of the source/target information generator/display is connected to the first output of the received information converter, while the second input of the received information converter is connected to the first output of the device for generating and processing service information, the fifth input of the source/target information generator/display is connected to the second output of device for generating and processing service information, while the fourth output of the device for generating and processing service information is connected to the fifth input of the receiving-transmitting unit, the third output of the device for generating and processing service information is connected to the third input of the cryptographic computer, while the fourth output of the cryptographic computer is connected to the third input of the source/target information converter, the third output of the received information converter is connected to the fourth input of the source/target information converter, the sixth input of the source/target information generator/display is connected to the first output of the confidentiality level selection button module, while the second input of the module is connected to the seventh input of the on/off button module for confidential message receive/transmit mode, the third input of the confidentiality level selection button module is connected to the sixth input of the device for generating and processing service information.

2. The device according to claim 1, wherein the on/off button module for confidential message receive/transmit mode is configured to transmit/receive information signals through the cryptographic computer/received information converter, while the third input of the module is connected to the fifth input of the device for generating and processing service information, the fourth output of the on/off button module for confidential message receive/transmit mode is connected to the fifth input of the cryptographic computer, and the fifth output of the module is connected to the fourth input of the received information converter.

3. The device according to claim 1, wherein the on/off button module for confidential message receive/transmit mode is configured to transmit/receive information signals through the source/target information converter of the mobile phone (gadget), while the sixth output of the on/off button module for confidential message receive/transmit mode is connected to the fifth input of the source/target information converter, and the seventh input of the on/off button module for confidential message receive/transmit mode is connected to the second input of the confidentiality level selection button module.

4. The device according to claim 1, wherein the on/off button module for confidential message receive/transmit mode and the confidentiality level selection button module are provided in the form of buttons or switches located on the phone's (gadget's) body or in the form of touchscreen icons on the mobile phone's (gadget's) touchpad.

* * * * *

UNITED STATES PATENT AND TRADEMARK OFFICE
CERTIFICATE OF CORRECTION

PATENT NO. : 10,581,809 B2
APPLICATION NO. : 15/765032
DATED : March 3, 2020
INVENTOR(S) : Volodymyr Vasiliovich Khylenko Page 1 of 1

It is certified that error appears in the above-identified patent and that said Letters Patent is hereby corrected as shown below:

In the Specification

In Column 4, Line 54, delete "source target" and substitute therefore --source/target--

In Column 5, Line 54, delete "source target" and substitute therefore --source/target--

In Column 6, Line 55, delete "ran/off" and substitute therefore --on/off--

Signed and Sealed this
Twenty-second Day of September, 2020

Andrei Iancu
*Director of the United States Patent and Trademark Office*